March 14, 1933.  G. KINSMAN  1,901,456
OIL BURNER
Filed Aug. 18, 1927  10 Sheets-Sheet 6
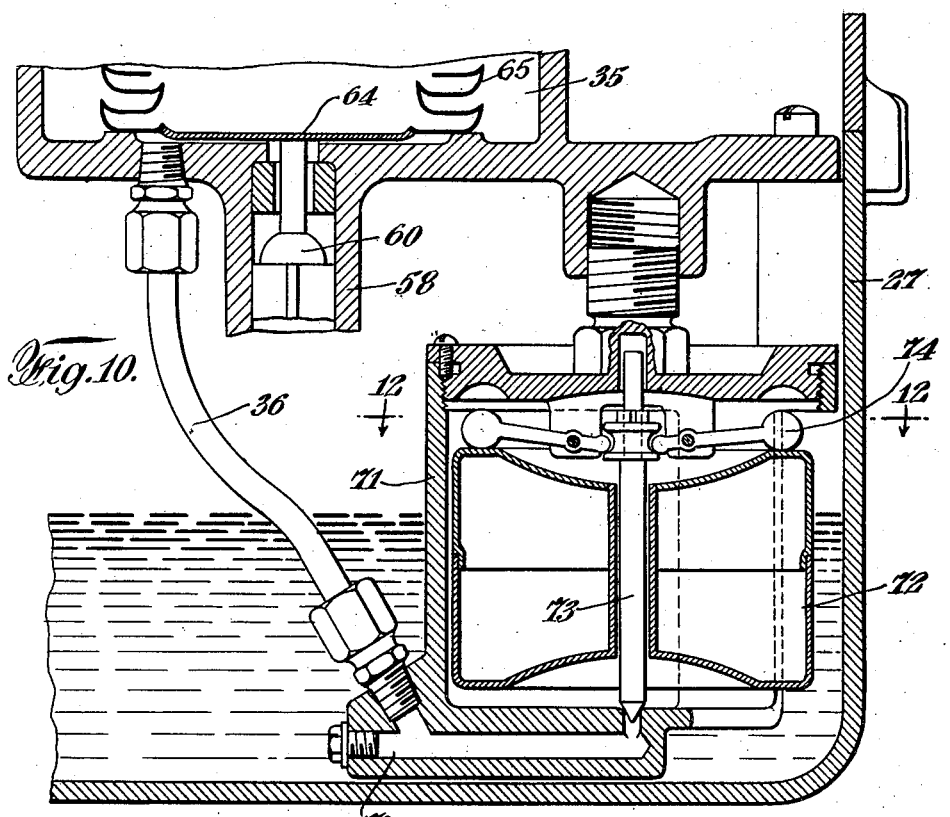
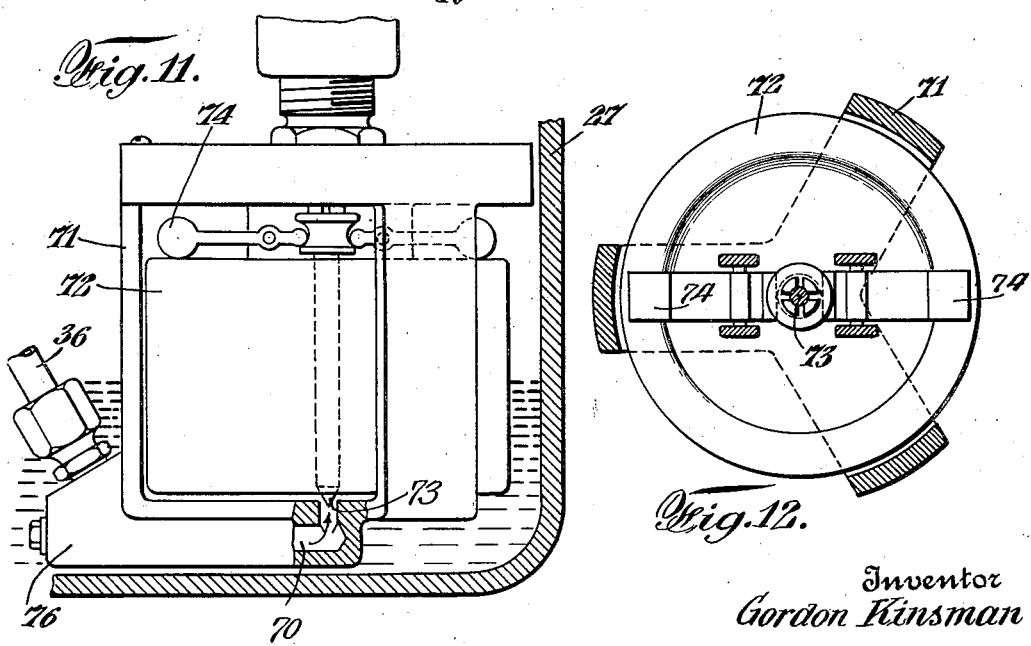
Inventor
Gordon Kinsman
By his Attorneys
Edwards, Sager & Bower

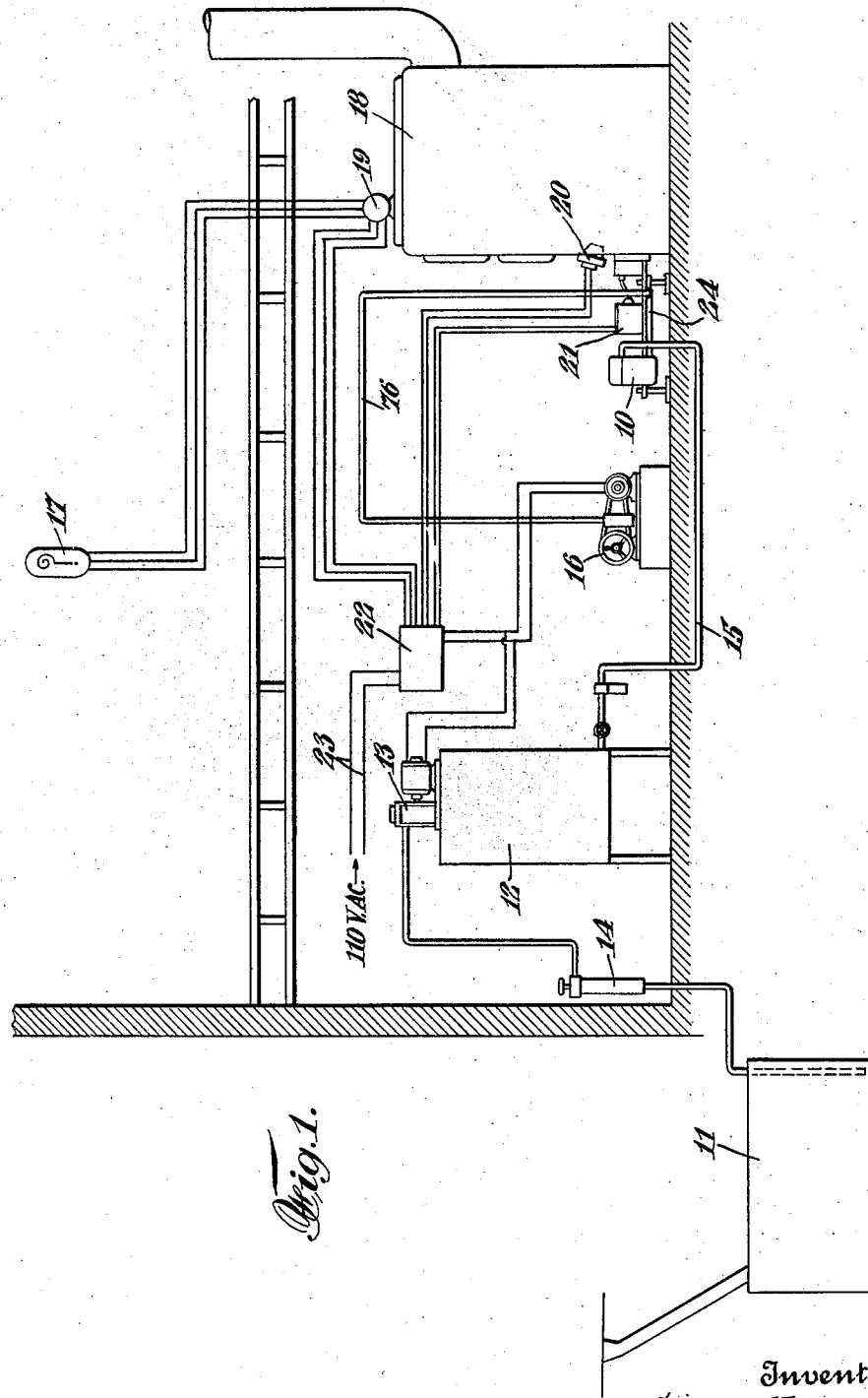

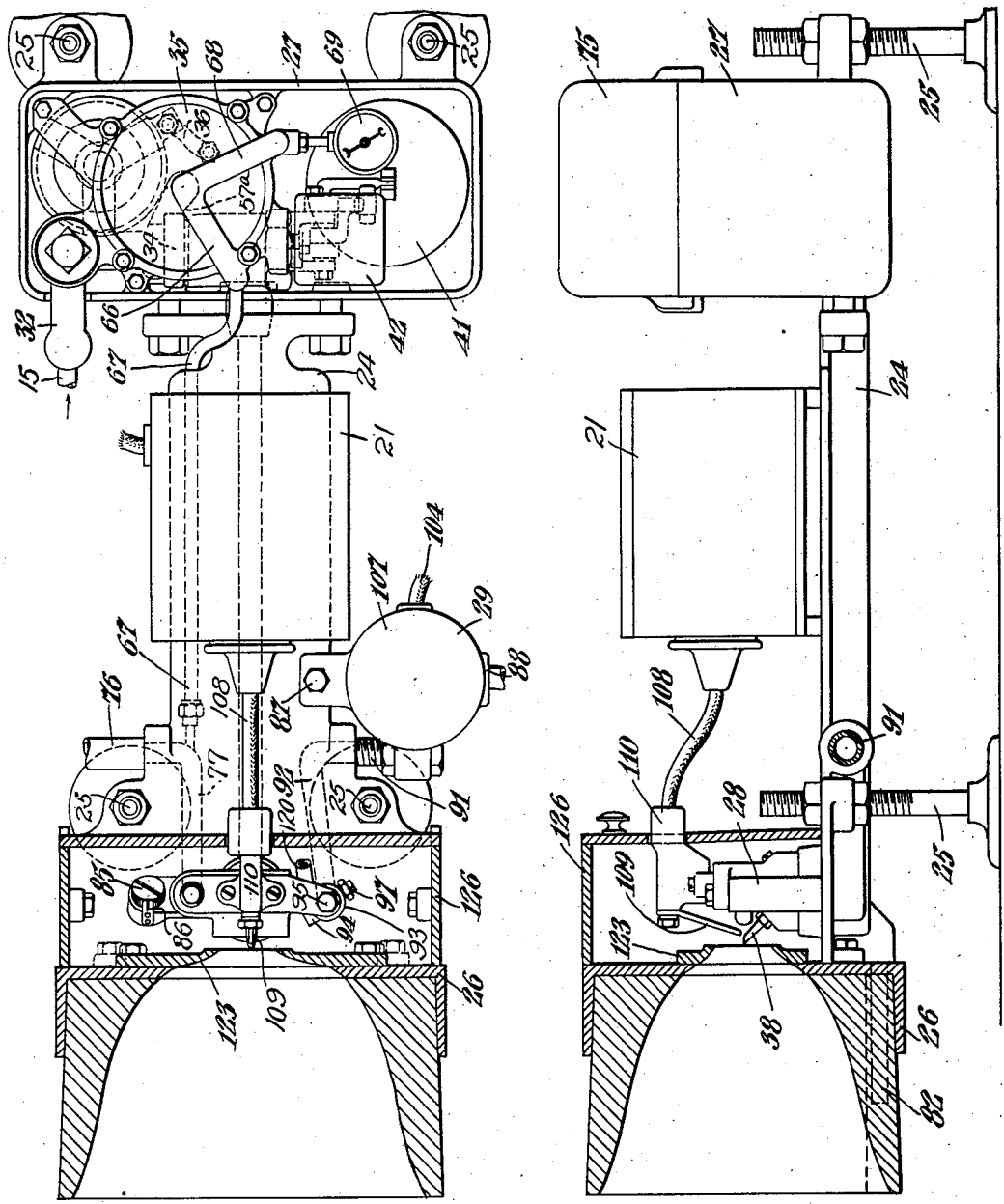

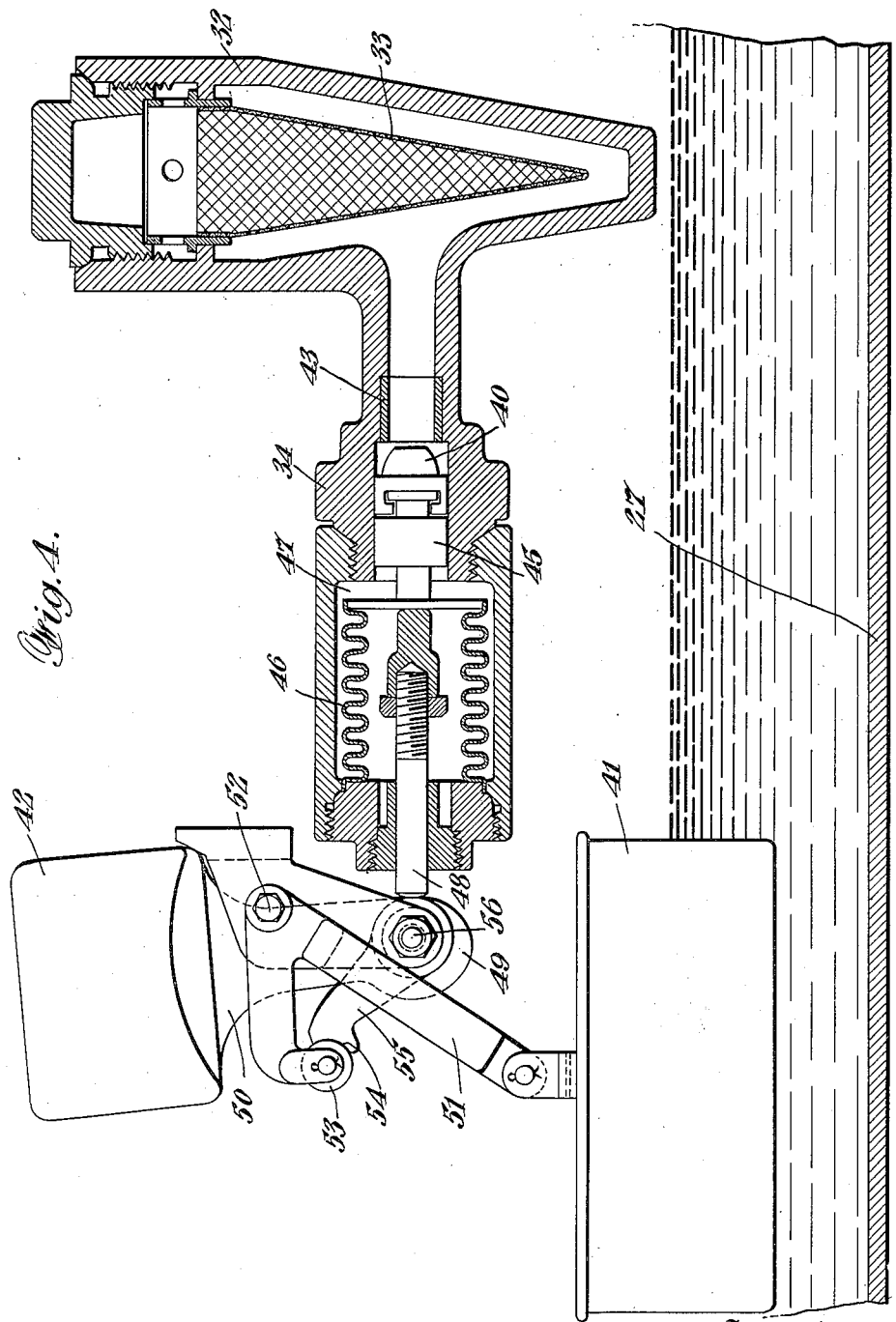

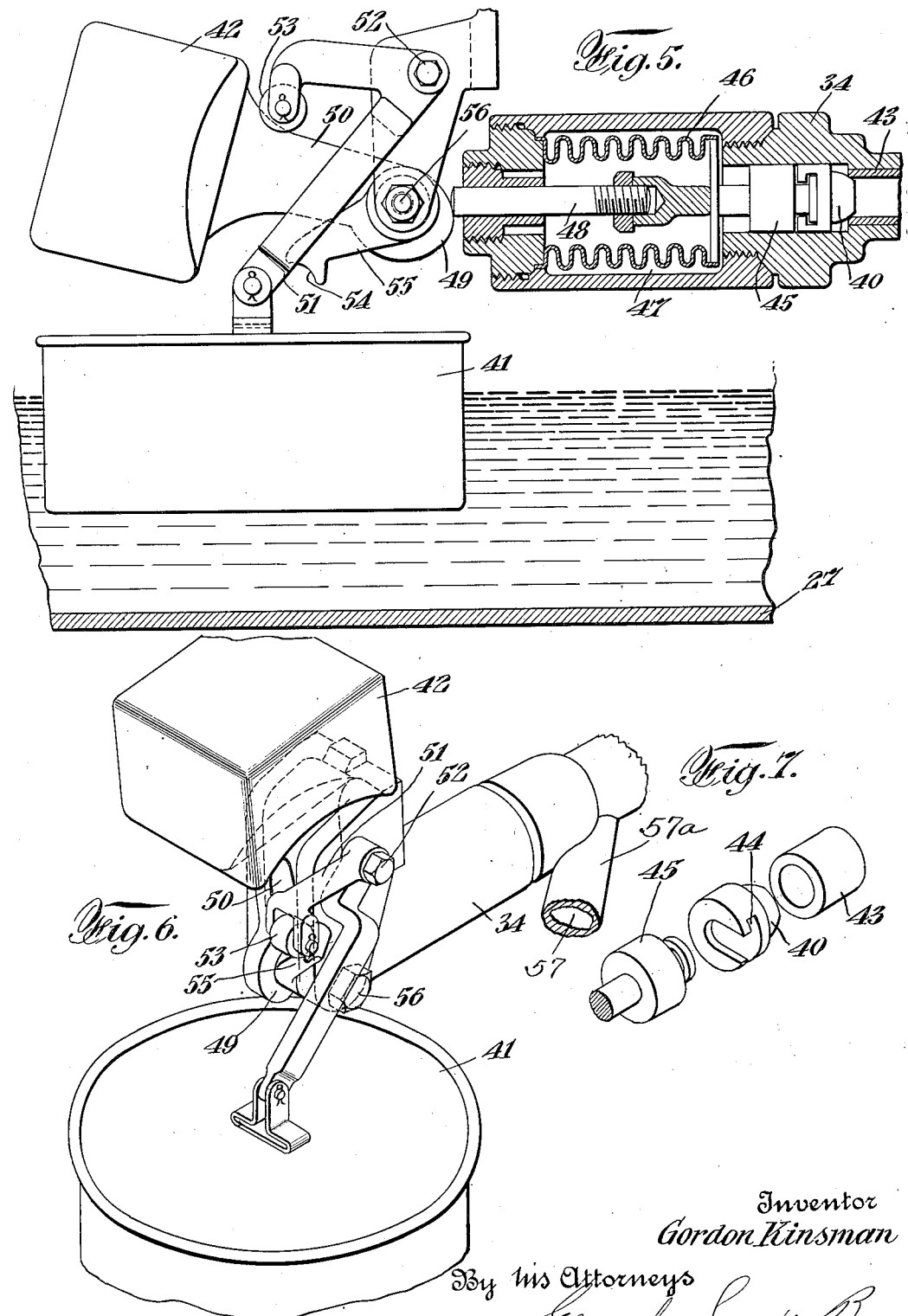

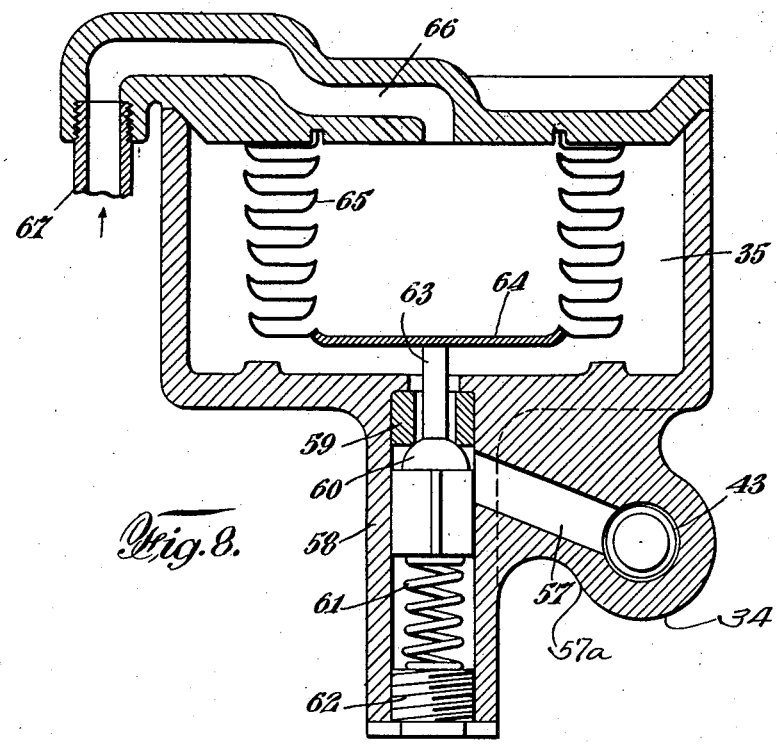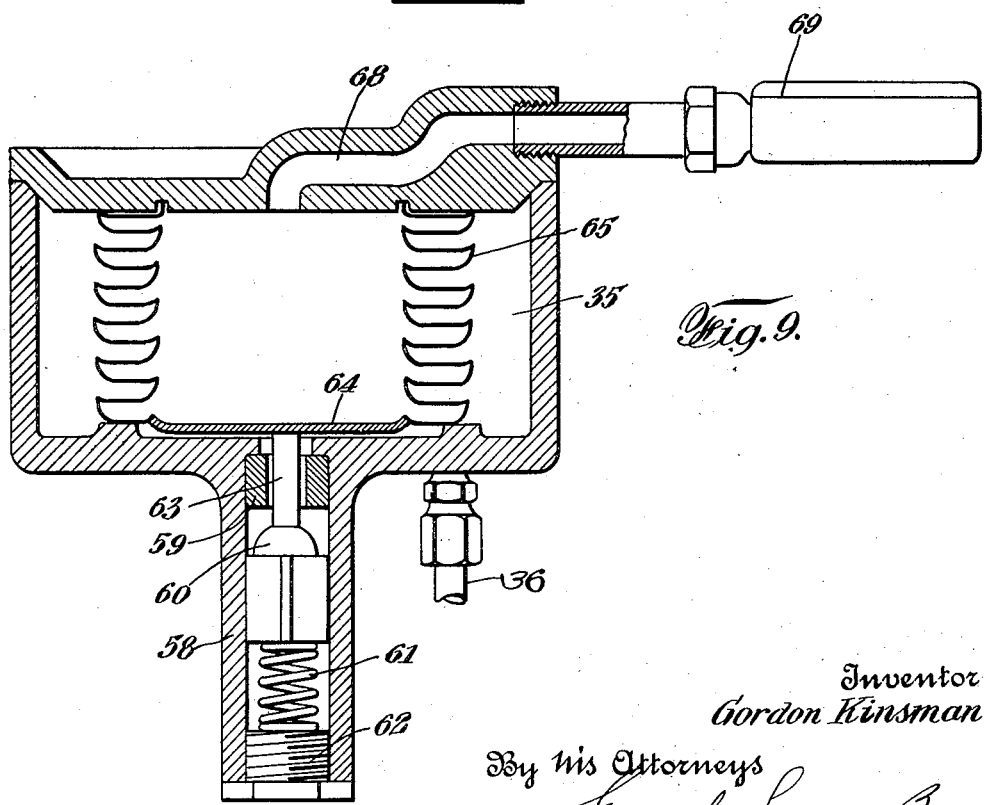

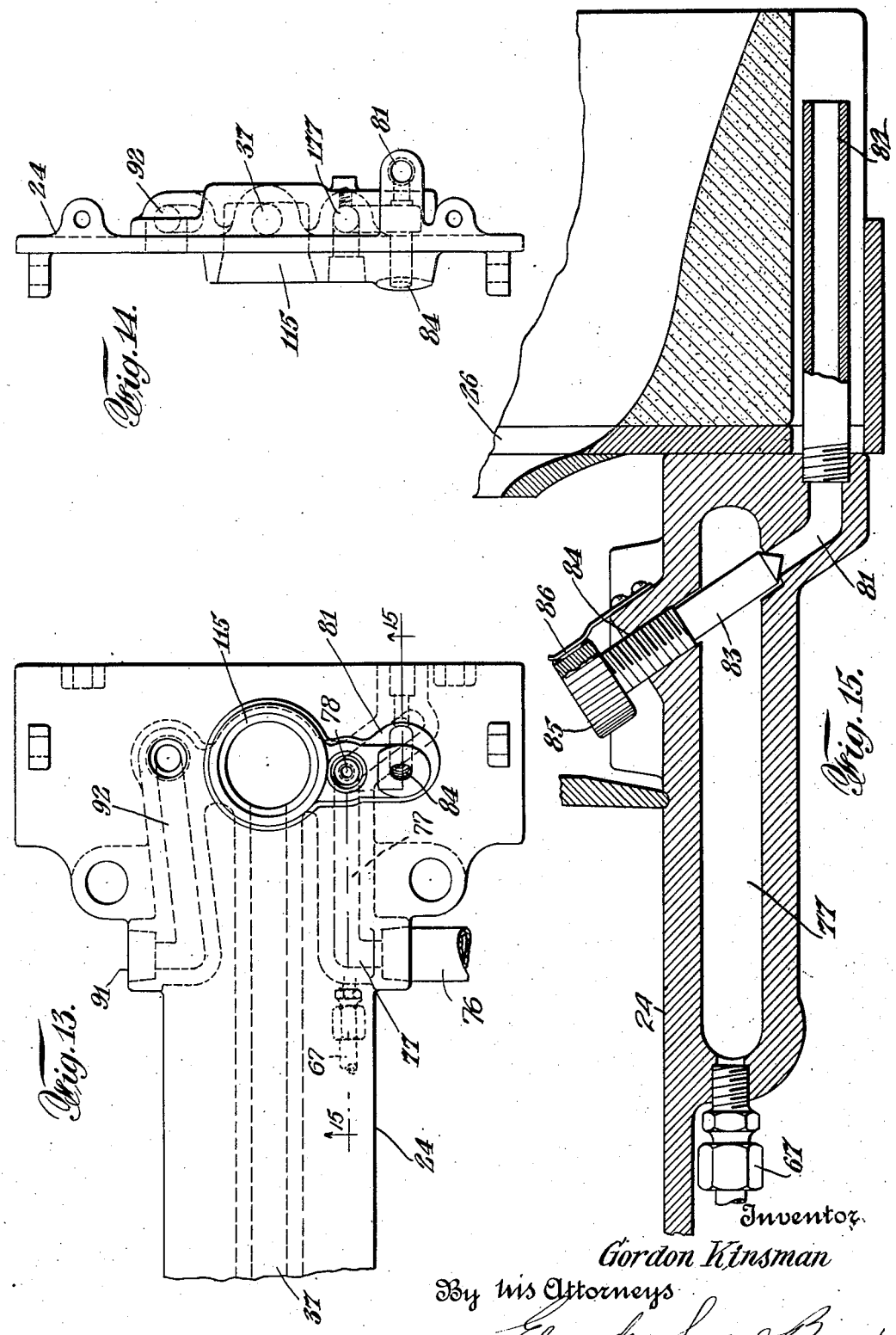

March 14, 1933.                G. KINSMAN                1,901,456
                                OIL BURNER
                        Filed Aug. 18, 1927         10 Sheets-Sheet 8
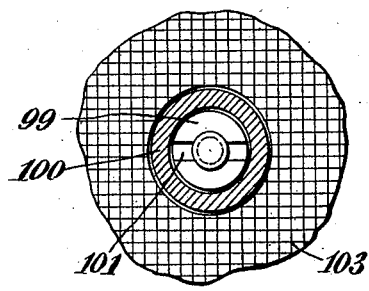
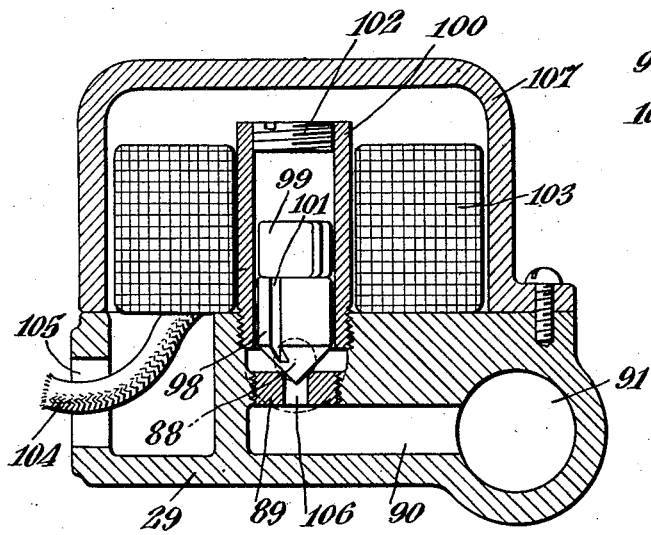
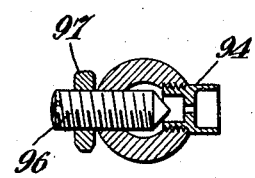
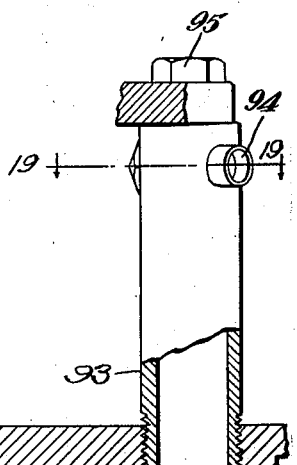
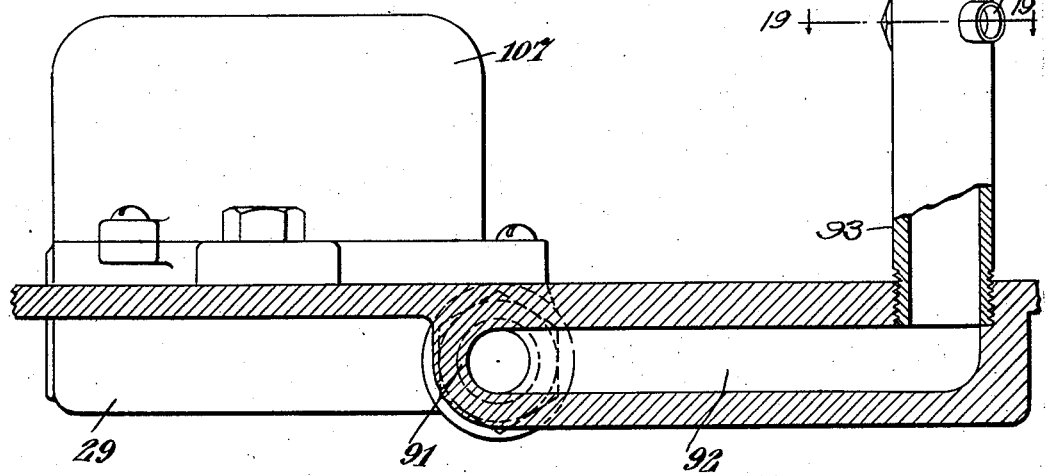
Inventor
Gordon Kinsman
By his Attorneys
Edwards, Sager & Bower

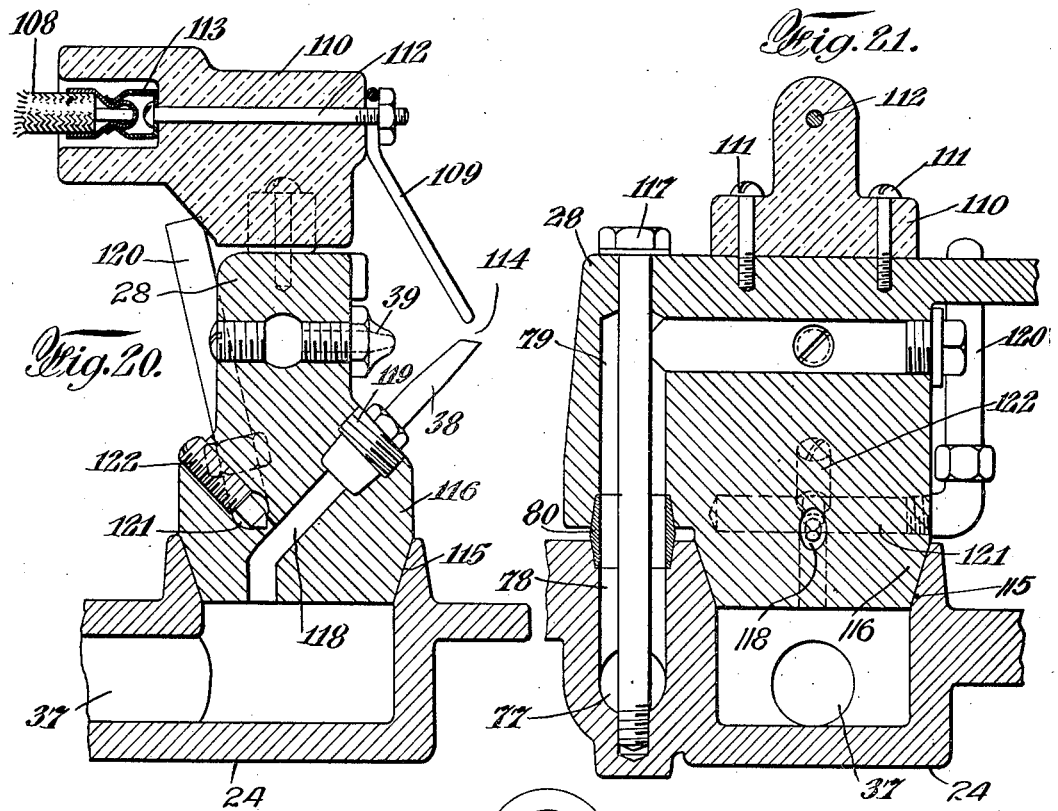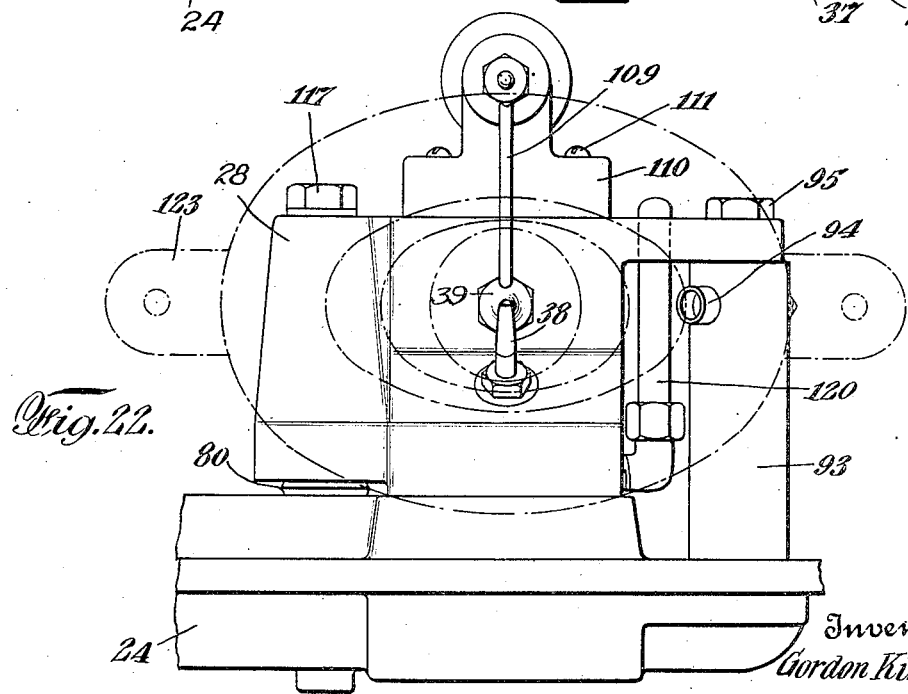

March 14, 1933. G. KINSMAN 1,901,456
OIL BURNER
Filed Aug. 18, 1927 10 Sheets-Sheet 10
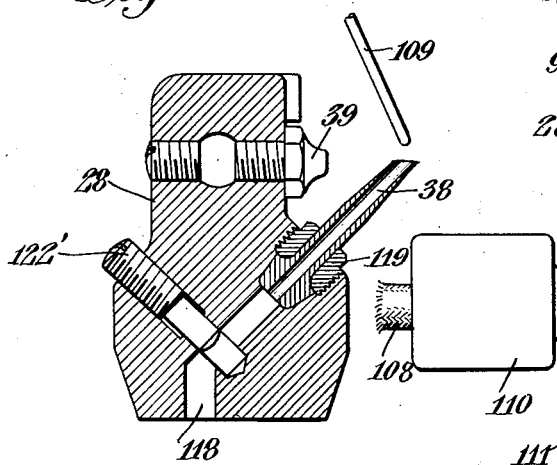
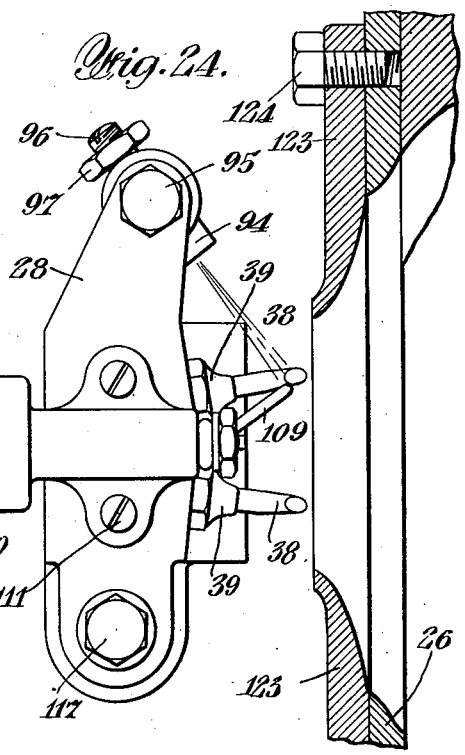
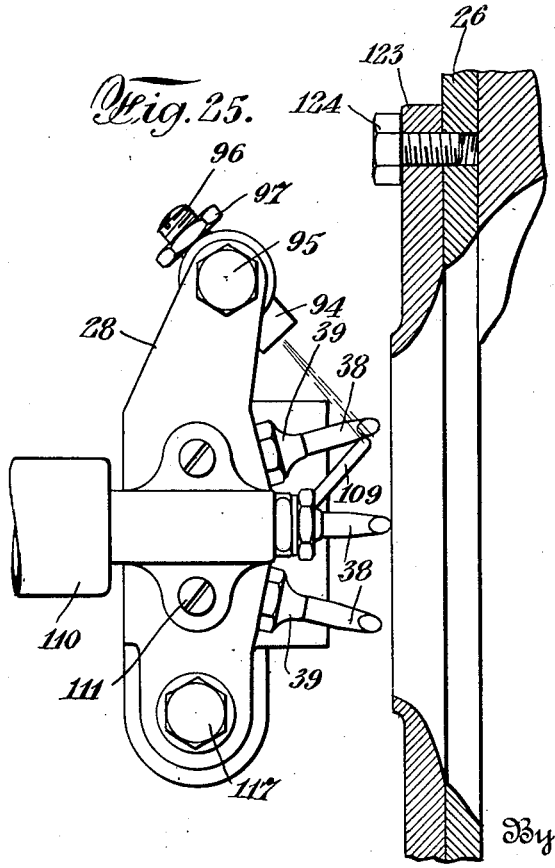
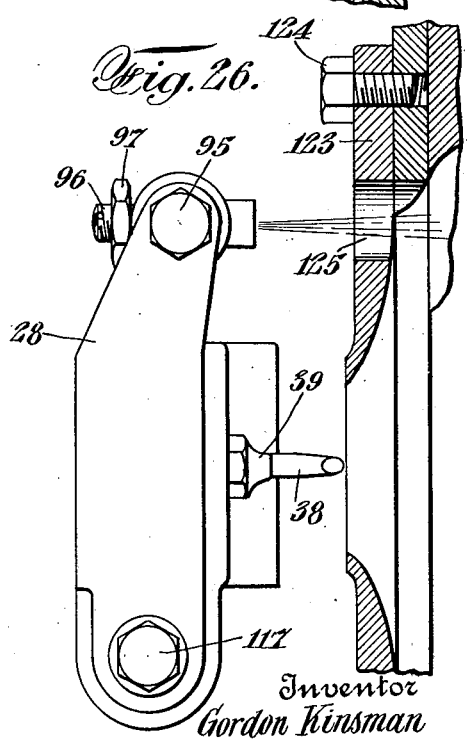
Inventor
Gordon Kinsman
By his Attorneys
Edwards, Sager & Bower Patented Mar. 14, 1933

1,901,456

UNITED STATES PATENT OFFICE

GORDON KINSMAN, OF JERSEY CITY, NEW JERSEY, ASSIGNOR TO CALOROIL BURNER CORPORATION, A CORPORATION OF DELAWARE

OIL BURNER

Application filed August 18, 1927. Serial No. 213,745.

This invention relates to automatic oil burner units and particularly to oil burners of the vacuum feed type adapted for installation with boilers and furnaces to permit the use of oil as a fuel in place of coal.

The object of the present invention is to provide an efficient, safe and economical oil burner unit of the vacuum feed type which can be readily installed in furnaces of various kinds, and more specifically to provide improved oil supply controlling devices, one embodiment of such devices being shown in detail in Figs. 4 to 7 inclusive. The controlling devices illustrated in detail in Figs. 8 to 10 form the subject matter of a divisional application Serial No. 629,590 filed August 20, 1932.

Other objects and advantages of the present invention will be apparent by reference to the following specification and drawings, in which Fig. 1 is a diagrammatic view of the present invention installed for operation with an ordinary boiler.

Fig. 2 is a plan view partially in section of the present invention.

Fig. 3 is a side elevation partially in section of Fig. 2.

Fig. 4 is an enlarged sectional view of the automatic safety shut off valve mechanism for the oil showing the valve in open position.

Fig. 5 is an enlarged sectional view similar to Fig. 4, showing the automatic safety shut off valve mechanism in closed position.

Fig. 6 is a perspective view of the float and weight for operating the safety shut off valve.

Fig. 7 is a perspective view of the safety shut off valve showing the manner of assembly.

Fig. 8 is a sectional view of the safety air operated valve mechanism for shutting off the oil supply upon failure of the air pressure.

Fig. 9 is a sectional view of the safety air operated valve mechanism approximately at right angles to Fig. 8.

Fig. 10 is a sectional view of the float valve in closed position for maintaining a constant level of oil in the burner.

Fig. 11 is a side elevation partially in section of the float valve in open position.

Fig. 12 is a view on line 12—12 of Fig. 10.

Fig. 13 is a plan view of an end portion of the burner end of the base of the oil burner and also shows certain air connections.

Fig. 14 is an end elevation of the burner end of the base shown in Fig. 13.

Fig. 15 is an enlarged sectional view of the needle valve control for the air supply taken on the line 15—15 of Fig. 13 and shows certain parts not appearing in Fig. 13.

Fig. 16 is a sectional view of the automatic gas valve.

Fig. 17 is a sectional view of the gas valve plunger.

Fig. 18 is a side elevation partially in section showing the gas connection from the gas valve to the gas nozzle.

Fig. 19 is a sectional view of the gas nozzle taken on the line 19—19 of Fig. 18.

Fig. 20 is a sectional view of a single burner head mounting showing the electrical ignition and the means for controlling the air control for admitting air to the oil supply.

Fig. 21 is a vertical sectional view of Fig. 20.

Fig. 22 is an end elevation of the single nozzle oil burner at the atomizing end of the burner showing in dotted lines the various openings corresponding to the number of nozzles.

Fig. 23 is a sectional view of a burner head showing the mechanical control for the oil supply to the oil nozzle.

Fig. 24 is a plan view partially in section of a two nozzle installation with a gas and an electric ignition.

Fig. 25 is a plan view partially in section similar to Fig. 24 showing the triple nozzle installation, and Fig. 26 is a plan view partially in section showing a single nozzle with a gas ignition.

The invention may be embodied in an oil burner unit with valves for controlling the oil supply to the burners upon failure of the air supply or failure of any of the operating parts and also valves for controlling the intensity of the heating flame. A supply reservoir is mounted on the base of the unit from which the oil is lifted by automatically creating a vacuum by means of compressed air. An electrically operated igniter is mounted adjacent the atomizing and vaporizing nozzles for igniting the atomized and vaporized oil and in some installations a gas pilot burner is used, the supply of gas being automatically operated with the operation of the unit.

Fig. 1 illustrates diagrammatically a complete installation of an oil burner unit 10 embodied in the invention. The oil is stored in an outside underground storage tank 11 and is pumped into an auxiliary tank 12 by means of an electric pump 13 or a hand pump 14 from which it flows through pipe 15 to the unit. The air supply is provided by an air compressor unit 16 which is controlled by a room thermostat 17. The boiler 18 is provided with an electric safety control 19 and the operation of the unit is controlled by a flame safety 20 or its equivalent controlled by the flame from the burner. The various electrical connections for the pump 13, compressor 16, safety control 19, flame safety 20 and transformer 21 lead to an automatic electric switch 22 which is connected to the power line 23. When the temperature drops below a predetermined degree the room thermostat 17 will form electric contacts for operating the burner. The air compressor unit 16 will operate to supply air to the burner for atomizing and vaporizing the oil. The electric igniter connected to the transformer will ignite the atomized and vaporized oil causing a heating flame and thereafter will stop functioning. If the igniter fails to ignite the atomized and vaporized oil after a predetermined period, adjusted at the automatic switch 22, the flame safety 20 will break the circuit preventing operation of the burner. If the igniter functions properly and the atomized and vaporized oil is ignited the heat from the oil flame will act on the flame safety 20 so as to prevent it from breaking the circuit. If the circuit is broken it is necessary to manually reset the automatic switch 22.

In the embodiment of the oil burner unit 10 illustrated, a base 24 supported upon adjustable legs 25 to position the unit horizontally is provided at one end with the Venturi brick support 26, and at its opposite end with a constant level float tank 27 for controlling the feed of oil to the burner. Adjacent to the Venturi brick support is a detachable support or head 28 supporting one or more oil nozzles and air nozzles. Mounted on the base 24 between the float tank 27 and the nozzle head 28 is an automatic gas control valve 29 and a high tension transformer 21.

The oil enters the float tank 27 through a pipe 15, passing through chamber 32, where it passes through strainer 33, valve 34, chamber 35, pipe connection 36 to the float tank 27. From the float tank 27 the oil passes through passage 37 of the base 24 to the oil nozzle 38, the oil being fed upwardly through the oil nozzle by the suction resulting from the ejector action of the jet from the air nozzle 39. The valve plunger 40 of the valve 34 is controlled by a float 41 in the float tank 27 so that when there is an overflow of oil in the tank 27 the float 41 will be raised releasing the weight 42 which will seat plunger 40 against valve seat 43 preventing flow of oil into chamber 35. The valve plunger 40 is provided with a T slot 44 for the head of plunger 45. The valve 34 is normally held in open position by means of an expanding bellows 46 within a chamber 47. A plunger 48 within the bellows extends outwardly through the valve casing bearing against a cam surface 49 on the extension 50 of the weight 42. The float 41 is attached to a bell crank lever 51 pivoted at 52 to a frame section of the chamber 35 so that a raising of the float 41 will release roller 53 on the outer end of the bell crank lever 51 from contact with the seat 54 of lever 55 attached to and pivoted at 56 with the extension 50. The release of roller 53 permits weight 42 which is suspended at a point less than its vertical center to fall by gravity, the cam surface 49 forcing the plunger 48 forward against the action of bellows 46 which seats valve plunger 40 shutting off the oil supply from pipe 15.

The oil passes through valve 34 to a passage 57 leading to extension 58, the interior of which communicates with the chamber 35. The passage 57 lies in a portion 57a of the frame which extends between valve 34 and extension 58 as best seen in Figs. 2 and 8. The extension 58 is provided with a valve seat 59 for valve plunger 60 which is pressed upwardly by the coiled spring 61 held in place by screw plug 62. Beyond the valve seat the valve plunger is provided with an extension 63 extending into oil chamber 35 and bearing against plate 64 of extensible bellows 65. The interior of bellows 65 is connected by passage 66 and pipe 67 to the compressed air supply so that when compressed air extends the bellows the valve plunger 60 is opened against the action of spring 61 permitting oil to flow into chamber 35. If the air supply fails the bellows 65 will not be extended and the valve plunger 60 will be seated by the action of spring 61 and no oil is permitted to flow into chamber 35. A passage 68 is also provided for the air supply having a pressure gauge 69 connected thereto to indicate the air pressure. It will be noticed that at the same time that the valve plunger 60 is being seated that the decreased space occupied by the bellows 65 will tend to draw oil into the chamber 35 to occupy such space. But the closing of the valve prevents oil from being drawn into the chamber through the passage 57 and there is therefore a marked tendency to draw the oil back through the pipe 36 and to thus effectuate a very prompt cessation of the flow of oil to the burner.

The oil as it flows from pipe 36 passes into passage 70 of a frame 71 which forms a guide to the float 72 which maintains a constant level of oil within the float tank 27. A needle valve 73 opens and closes the oil from the passage 70 which is raised or lowered in accordance with the oil demand within float tank 27. The valve stem is lowered by the pivoted counter weights 74 which as the float 72 raises close the needle valve 73 and when the float drops the needle valve 73 is raised permitting more oil to flow from chamber 35 to float chamber 27. The float chamber 27 is provided with a cover 75 for preventing dust and foreign material from getting into the oil and to protect the parts.

It will be thus readily seen that if the air supply for atomizing and vaporizing the oil fails, the oil supply to the tank is automatically shut off by valve 60 and also if the constant float valve 73 fails to function to control the level of the oil in the float tank 27 or any break in the connections overflows the float tank 27 above a safety level the valve 40 automatically shuts off the oil supply.

The compressed air from the air compressor unit 16 enters the base 24 through pipe 76 and passage 77. The pipe line 67 for air to bellows 65 taps into passage 77 more clearly shown in Fig. 15. The passage 77 leads to an upwardly extending passage 78 within the base 24 to the air passage 79 of the nozzle head 28 which passage leads directly to the air nozzle 39. Between passages 78 and 79 is inserted an air tight connection 80. To control the amount of air permitted to pass through nozzle 39 as the air compressor unit 16 runs at a constant speed a passage 81 is provided which will by pass the air through pipe 82 which leads into the boiler. See Fig. 15. A needle valve 83 is provided within this passage for controlling the by passing of the air screw threaded to the casting 24 at 84. The head 85 of the valve is knurled or slotted and held in adjusted position by leaf spring 86 attached to the base 24.

In the units using gas for ignition an electrically operated gas valve 29 is secured at 87 to the base 24. The gas enters the valve through passage 88, passes through valve seat 89 through passage 90 to connection 91 connected to passage 92 of the base 24. The passage 92 connects with a vertical pipe 93 which supports the gas nozzle 94 and also provides a support for the head 28 which is secured thereto by means of bolt 95. A needle valve 96 with a lock nut 97 is threaded into pipe 93 for adjusting the gas as clearly shown in Fig. 19. The gas valve plunger 98 is seated by means of weight 99 both sliding within tube 100 and provided with slots 101 for magnetic purposes. The tube 100 is closed at its top by means of screw plug 102 to prevent escape of gas and is surrounded by coil 103 forming a solenoid. The lead wire 104 passes into the valve 29 through opening 105 and upon energizing the coil 103 the valve plunger 98 is lifted by the solenoid action opening the passage 106 of the valve seat 89 permitting the gas to flow to the nozzle 94.

The valve 29 is provided with a cover 107.

The electric ignition system used to ignite the burner directly or in combination with the gas is provided by a high tension transformer 21 connected by lead wire 108 to electrode 109 supported within block 110 of insulated material such as porcelain mounted on nozzle head 28 by screws 111. The electrode 109 is held in adjusted position by means of bolt 112 passing through the block 110, one end being connected to clip 113 connected to lead wire 108. The intensely hot spark jumps from the electrode across the gap 114 between it and the oil nozzle 38, one side of the circuit being suitably grounded on the base.

The base 24 is provided with a conical opening 115 for the various heads 28 which vary as to the number of burners and whether electrically ignited, gas ignited or the combination of gas and electricity, as shown in Figs. 20 to 26, inclusive. The head 28 is provided with a conical base 116 fitting into opening 115 and is secured in position by bolt 117 passing through air passages 78, 79 and connector 80 and threaded to base 24 and bolt 95. The oil passage 37 leads into opening 115 and the oil passes therefrom into opening 118 of the head 28 which leads to the nozzle 38 threaded into the head 28 at 119. To regulate the oil supply before it leaves the nozzle, air is admitted to passage 118 to mix with the oil before it is atomized and vaporized which will aid materially in the breaking up of the oil. The air is admitted through pipe 120 open to the atmosphere and connected to passage 121 of the head 28 which leads into passage 118. A threaded needle valve 122 is provided at the juncture of passages 118 and 121 which regulates the amount of air admitted or shuts it off entirely in accordance with the oil demand.

Fig. 23 discloses a second method of regulating the oil supply to the oil nozzle 38 which consists of a valve 122' which forms a mechanical obstruction to the oil as it passes through the oil passage 118. This valve 122' permits more or less oil to be drawn to the nozzle 38 depending upon its position across the passage 118.

Figs. 24, 25 and 26 show various heads 28 which as described are interchangeable and the same base 24 is used for all the various heads. The plates 123 attached to the Venturi plate 26 are removably secured by bolts 124 as the central openings for the burner flame varies with the type of head used, that is, the greater the number of flames, the larger the opening in plate 123. The plate 123 shown in Fig. 26 when a gas pilot only is used for ignition is provided with an opening 125 for the pilot flame.

The head 28 and its adjoining connections are enclosed by a removable covering casing 126 as clearly shown in Figs. 2 and 3.

In the oil burner unit of this invention the various elements coordinate so that when one fails there is no danger of injecting a highly explosive mixture into the boiler which has not been ignited nor will there be an overflow of oil from the unit. The flame safety 20 is operated by the heat from the flame and shuts off the current in the event that the ignition system should fail. The magnetic gas valve 29 shuts off the gas when no current is flowing and is connected in parallel with the transformer. The valve 60 shuts off the oil supply when the air supply fails and valve 40 shuts off the oil supply in the event of a threatened overflow of the oil in tank 27.

Various changes and modifications may be made without departing from the scope of the invention or sacrificing any of its advantages.

I claim:—

In a cutoff for oil burners the combination of an oil tank, a plunger valve for cutting off the supply of oil to said tank, a bellows connected to said plunger valve and normally maintaining it open, said plunger valve acting to maintain the bellows out of contact with the oil, a weight for actuating said valve to shutoff position, a cam operative thereby, a plunger loosely interposed between said cam and said bellows, a trip for the weight normally maintaining it in inoperative position, a float in said tank, and connections between said float and said trip effective to release the weight when the oil in the tank rises above a predetermined level.

GORDON KINSMAN.